United States Patent
Yang et al.

(10) Patent No.: US 9,722,975 B2
(45) Date of Patent: Aug. 1, 2017

(54) METHODS AND APPARATUS FOR ESTABLISHING A SECURE COMMUNICATION CHANNEL

(71) Applicant: Apple Inc., Cupertino, CA (US)

(72) Inventors: Xiangying Yang, Cupertino, CA (US); Li Li, Los Altos, CA (US); Jerrold Von Hauck, Windermere, FL (US)

(73) Assignee: Apple Inc., Cupertino, CA (US)

( * ) Notice: Subject to any disclaimer, the term of this patent is extended or adjusted under 35 U.S.C. 154(b) by 40 days.

(21) Appl. No.: 14/789,905

(22) Filed: Jul. 1, 2015

(65) Prior Publication Data

US 2016/0006729 A1    Jan. 7, 2016

Related U.S. Application Data

(60) Provisional application No. 62/020,953, filed on Jul. 3, 2014, provisional application No. 62/021,628, filed on Jul. 7, 2014.

(51) Int. Cl.
*H04L 29/06* (2006.01)

(52) U.S. Cl.
CPC ........ *H04L 63/0428* (2013.01); *H04L 63/062* (2013.01); *H04L 63/065* (2013.01); *H04L 63/105* (2013.01); *H04L 63/0853* (2013.01)

(58) Field of Classification Search
None
See application file for complete search history.

(56) References Cited

U.S. PATENT DOCUMENTS

| | | | |
|---|---|---|---|
| 7,127,063 | B2 | 10/2006 | Lambert et al. |
| 9,537,858 | B2 | 1/2017 | Ziat |

(Continued)

FOREIGN PATENT DOCUMENTS

| | | |
|---|---|---|
| CN | 1889433 | 1/2007 |
| CN | 101286840 | 10/2008 |
| TW | 201408110 | 2/2014 |

OTHER PUBLICATIONS

Taiwan Patent Application No. 104121390, Office Action Issued Jun. 6, 2016 with Search Report.
Search Report & Written Opinion of the International Searching Authority Dated Oct. 16, 2015.
GSM Association Official Document 12FAST.15, "Remote Provisioning Architecture for Embedded UICC Technical Specification"; Version 1.0; Dec. 17, 2013; p. 1-294.

(Continued)

*Primary Examiner* — Hadi Armouche
*Assistant Examiner* — Andrew Steinle
(74) *Attorney, Agent, or Firm* — Downey Brand LLP

(57) ABSTRACT

A method for establishing a secure communication channel between an off-card entity and an embedded Universal Integrated Circuit Card (eUICC) is provided. The method involves establishing symmetric keys that are ephemeral in scope. Specifically, an off-card entity, and each eUICC in a set of eUICCs managed by the off-card entity, possess long-term Public Key Infrastructure (PKI) information. When a secure communication channel is to be established between the off-card entity and an eUICC, the eUICC and the off-card entity can authenticate one another in accordance with the respectively-possessed PKI information (e.g., verifying public keys). After authentication, the off-card entity and the eUICC establish a shared session-based symmetric key for implementing the secure communication channel. Specifically, the shared session-based symmetric key is generated according to whether perfect or half forward security is desired. Once the shared session-based symmetric key is established, the off-card entity and the eUICC can securely communicate information.

18 Claims, 7 Drawing Sheets

(56) References Cited

U.S. PATENT DOCUMENTS

| | | | |
|---|---|---|---|
| 2002/0191797 | A1 | 12/2002 | Perlman |
| 2006/0242407 | A1* | 10/2006 | Kimmel .............. H04L 63/0428 |
| | | | 713/166 |
| 2008/0118059 | A1 | 5/2008 | Shenfield et al. |
| 2009/0239503 | A1 | 9/2009 | Smeets |
| 2012/0087493 | A1 | 4/2012 | Chidambaram et al. |
| 2012/0108205 | A1* | 5/2012 | Schell ................... H04W 4/001 |
| | | | 455/411 |
| 2012/0108295 | A1 | 5/2012 | Schell et al. |
| 2013/0016831 | A1 | 1/2013 | Lambert et al. |
| 2013/0294600 | A1 | 11/2013 | Little |
| 2014/0003604 | A1* | 1/2014 | Campagna ................ H04L 9/08 |
| | | | 380/247 |
| 2014/0365776 | A1* | 12/2014 | Smets ................... H04L 9/0841 |
| | | | 713/171 |
| 2015/0341791 | A1 | 11/2015 | Yang et al. |

OTHER PUBLICATIONS

International Application No. PCT/US2015/038748, International Global Platform, "Global Platform Card—Security Upgrade for Card Content Management Card Specification v 2.2—Amendment E"; Version 1.0; Nov. 2011; GPC_SPE_042.

Yang et al., "Electronic Subscriber Identity Module Provisioning", U.S. Appl. No. 14/715,761 filed May 19, 2015.

NIST SP 800-56A, Recommendation for Pair-Wise Key Establishment Schemes Using Discrete Logarithm Cryptography Mar. 2007, 115 pages.

\* cited by examiner

METHODS AND APPARATUS FOR ESTABLISHING A SECURE COMMUNICATION CHANNEL

CROSS-REFERENCE TO RELATED APPLICATIONS

The present application claims the benefit of U.S. Provisional Application No. 62/020,953, entitled "METHODS AND APPARATUS FOR ESTABLISHING A SECURE COMMUNICATION CHANNEL", filed Jul. 3, 2014, the content of which is incorporated herein by reference in its entirety for all purposes. The present application also claims the benefit of U.S. Provisional Application No. 62/021,628, entitled "METHODS AND APPARATUS FOR ESTABLISHING A SECURE COMMUNICATION CHANNEL", filed Jul. 7, 2014, the content of which is incorporated herein by reference in its entirety for all purposes.

FIELD

The described embodiments relate generally to wireless communications technology. More particularly, the present embodiments relate to electronic Subscriber Identity Module (eSIM) provisioning using a secure communication channel.

BACKGROUND

Wireless communication devices, such as smart phones, have traditionally been configured to utilize Universal Integrated Circuit Cards (UICCs) that provide access to wireless network services. A UICC typically takes the form of a small removable card (e.g., a Subscriber Identity Module (SIM) card) that is inserted into a wireless communication device. In most cases, each UICC is associated with a single "Issuer"—such as a mobile network operator—that controls the programming and distribution of the UICC.

In more recent implementations, non-removable UICCs—referred to herein as embedded UICCs (eUICCs)—are being included on system boards of wireless communication devices. These eUICCs are distinct from the traditional removable UICCs in that the eUICCs are non-removable and soldered to the system boards of wireless communication devices. An eUICC can be programmed with one or more eSIMs, each of which can emulate and replicate the architecture of a typical SIM so as to enable a wireless communication device (that includes the eUICC) to access wireless network services.

The use of eUICCs and eSIMs can offer significant advantages over traditional UICCs. For example, eUICCs can provide wireless communication device manufacturers with increased flexibility in wireless communication device design due to the lack of a requirement to accommodate the size and form factor of a removable SIM card. As a further example, the ability to remotely provision (e.g., over-the-air) eSIMs can provide convenience for consumers and vendors when configuring a wireless communication device to access a mobile network operator's network.

Existing approaches for provisioning eSIMs—such as those specified by the GlobalPlatform™ Specification—involve encrypting the eSIMs using symmetric keys and transmitting the eSIMs from a provisioning entity to eUICCs of wireless communication devices. Specifically, each eUICC is associated with and stores a symmetric key, and the provisioning entity stores, for each eUICC known to the provisioning entity, a copy of the eUICC's symmetric key. In this manner, when the provisioning entity is tasked with delivering an eSIM to an eUICC, the provisioning entity can use the eUICC's symmetric key to securely encrypt and transmit the eSIM to the eUICC, whereupon the eUICC can decrypt and utilize the eSIM. By design, this symmetric key is shared by and known only to the provisioning entity and the eUICC in order to prevent malicious entities from intercepting, decrypting, and exploiting eSIM transmissions. Unfortunately, security flaws associated with this design continue to be problematic, and the overall level of exposure is increasing as the scale and complexity of wireless systems grow. As such, there exists a need for solutions that provide for increased security for communication channels established between an eUICC and external "off-card" entities.

SUMMARY

Some example embodiments provide methods, apparatuses, and computer program products for establishing a secure communication channel between an "off-card" entity (e.g., a provisioning entity) and an eUICC. Specifically, the example embodiments set forth techniques that involve establishing symmetric keys that are ephemeral (i.e., session-based) in scope. Specifically, an off-card entity, and each eUICC in a set of eUICCs managed by the off-card entity, possess long-term Public Key Infrastructure (PKI) information. When a secure communication channel is to be established between the off-card entity and an eUICC, the eUICC and the off-card entity can authenticate one another in accordance with the respectively-possessed PKI information (e.g., by verifying public keys). After authenticating one another, the off-card entity and the eUICC carry out steps that involve establishing a session-based symmetric key for securing data transmitted between the off-card entity and the eUICC. When "perfect forward security" is desired, each of the off-card entity and the eUICC generate respective ephemeral PKI information used by one another to establish a shared session-based symmetric key. When "half forward security" is desired, only the off-card entity generates ephemeral PKI information when establishing the shared session-based symmetric key, which can provide performance benefits. Once the shared session-based symmetric key is established, the off-card entity and the eUICC can securely communicate information between one another. In some embodiments, the shared session-based symmetric key can be cached by the off-card entity and the eUICC to reduce the overhead involved when establishing secure connections at subsequent times. Alternatively, the shared session-based symmetric key can be discarded each time the secure connection between the off-card entity and the eUICC is closed, thereby providing a higher level of security.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings, which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
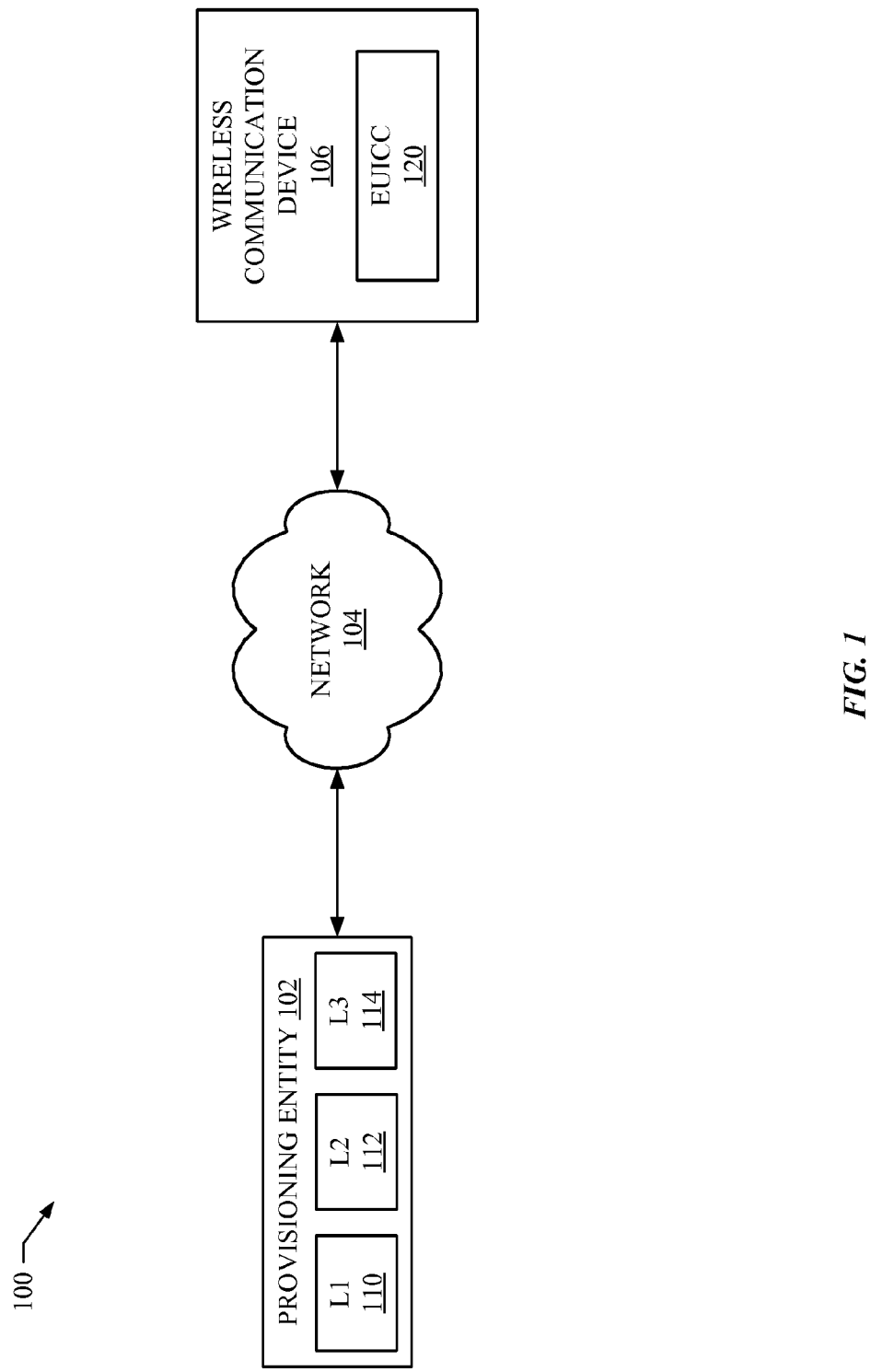
FIG. 1 illustrates an example system for eSIM provisioning in accordance with some example embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Existing approaches for establishing secure communications between eUICCs and an "off-card" entity (also referred to herein as a "provisioning entity") rely on pre-established, long-term symmetric keys being possessed by the off-card entity and the eUICCs. For example, the GlobalPlatform™ Specification, Version 1.0 of the Security Upgrade for Card Content Management Card Specification version 2.2— Amendment E from November 2011, the contents of which are incorporated herein by reference in their entirety for all purposes, specifies that symmetric keys associated with eUICCs are maintained by the off-card entity that is positioned to carry out management tasks in conjunction with the eUICCs (e.g., provisioning new eSIMs to eUICCs, updating existing eSIMs at eUICCs, removing eSIMs from eUICCs, and the like). Specifically, to establish a secure communication channel between an off-card entity and an eUICC, the off-card entity identifies the eUICC, retrieves (e.g., from a local database) a symmetric key associated with the eUICC, and utilizes the symmetric key to encrypt data that is transmitted to the eUICC. Because, like the off-card entity, the eUICC possesses the symmetric key as well, the eUICC can successfully decrypt data that is received from the off-card entity, and can also encrypt data that is transmitted back to the off-card entity.

Unfortunately, many security flaws continue to compromise the overall integrity of the foregoing approach. One issue is that the off-card entity is required to store the symmetric key of each eUICC that the off-card entity is positioned to manage. This can present challenges with respect to efficiently (i.e., quickly) retrieving symmetric keys when eUICCs require management. Also, storing a collection of symmetric keys creates vulnerability as each symmetric key is stored in at least two locations (i.e., by the off-card entity and by an eUICC). Moreover, the amount of vulnerability scales with the level of backup that is being implemented. This can be problematic, for example, when heavily redundant databases are used to store the symmetric keys. Another issue is that when an eUICC is manufactured it is unclear how or by whom the eUICC will be utilized (e.g., which mobile network operator will be managing the eUICC). Consequently, as shifts occur between the management and/or ownership of eUICCs, large sets of symmetric keys need to be migrated between off-card entities, which drastically increases exposure levels. Yet another issue is that the complexity of symmetric keys is being increased to make it difficult for malicious parties to expose (e.g., derive) symmetric keys. As this complexity increases, the computing resources required to implement secure communications using the symmetric keys increase as well, which can be detrimental to the overall performance of computing devices that have limited processing and power resources available (e.g., mobile devices). Finally, yet another issue is that considerable "forward" security risks are associated with the existing symmetric key approach. Specifically, if a malicious party obtains a symmetric key, then the malicious party can utilize the symmetric key to potentially access available communication data (e.g., previous conversations) that were secured using the symmetric key.

Some example embodiments disclosed herein address the foregoing issues by implementing secure communications between off-card entities and eUICCs by establishing symmetric keys that are ephemeral (i.e., session-based) in scope. An off-card entity that is configured to manage a set of eUICCs possesses long-term Public Key Infrastructure (PKI) information, which can include a pair consisting of a public key ($PK_{server}$) and private (i.e., secret) key ($SK_{server}$). When a secure communication channel is to be established between the off-card entity and an eUICC, the eUICC can authenticate the off-card entity in accordance with at least a portion of the PKI information possessed by the off-card entity (e.g., by verifying a Certificate Authority (CA) whose digital signature is included in the public key ($PK_{server}$) possessed by the off-card entity). Similarly, the eUICC possesses its own long-term PKI information, which can include a pair consisting of a public key ($PK_{eUICC}$) and private key ($SK_{eUICC}$). The off-card entity can authenticate the eUICC in accordance with at least a portion of the long-term PKI information possessed by the eUICC (e.g., by verifying a CA whose digital signature is included in the public key ($PK_{eUICC}$) possessed by the eUICC). It is noted that in some embodiments a Certificate Authority is not required to carry out the foregoing authentication. Instead, self-signed certificates can be implemented, with the understanding that the root keysets on which the signatures are based are trusted by the off-card entity as well as the eUICCs. After authenticating one another, the off-card entity and the eUICC carry out steps that involve establishing a session-based symmetric key for securing data transmitted between the off-card entity and the eUICC. Here, two different approaches can be used, depending on whether "perfect forward security" or "half forward security" is desired.

When perfect forward security is desired, each of the off-card entity and the eUICC generate respective ephemeral PKI information. Specifically, the off-card entity generates an ephemeral public key ($ePK_{server}$) and a corresponding ephemeral private (i.e., secret) key ($eSK_{server}$), signs the $ePK_{server}$ using the long-term private key ($SK_{server}$) associated with the off-card entity, and provides the signed $ePK_{server}$ to the eUICC. Similarly, the eUICC generates an ephemeral public key ($ePK_{eUICC}$) and a corresponding ephemeral private key ($eSK_{eUICC}$), signs the $ePK_{eUICC}$ using the long-term private key ($SK_{eUICC}$) associated with the eUICC, and provides the signed $ePK_{eUICC}$ to the off-card entity. Subsequently, the off-card entity uses the $eSK_{server}$ and the signed $ePK_{eUICC}$ to generate a session-based (i.e., ephemeral) key, and the eUICC uses the $eSK_{eUICC}$ and the signed $ePK_{server}$ to generate an equivalent session-based symmetric key. This session-based symmetric key, independently generated by and now available to both the off-card entity and the eUICC, can be used by the off-card entity and the eUICC to secure communications that are transmitted between the off-card entity and the eUICC until the session is closed. It is noted that the dual-usage of separate ephemeral PKI information at the off-card entity and at the eUICC provides the benefit of helping to prevent "man in the middle" attacks. Moreover, the dual-usage of separate ephemeral PKI information makes it difficult for malicious parties to access previous communications associated with the eUICC even when the long-term PKI information associated with the off-card entity and/or eUICC is compromised.

When half forward security is desired, only the off-card entity generates ephemeral PKI information. Specifically, the off-card entity generates an ephemeral public key ($ePK_{server}$) and a corresponding ephemeral private (i.e., secret) key ($eSK_{server}$), signs the ephemeral public key $ePK_{server}$ using the long-term private key ($SK_{server}$) associated with the off-card entity, and provides the signed $ePK_{server}$ to the eUICC. The eUICC provides its public key $PK_{eUICC}$ to the off-card entity. Subsequently, the off-card entity uses the ephemeral secret key $eSK_{server}$ and the provided public key $PK_{eUICC}$ to generate a session-based (i.e., ephemeral) key, and the eUICC uses its own secret key $SK_{eUICC}$ and the $ePK_{server}$ to generate an equivalent session-based symmetric key. This session-based symmetric key, independently generated and now available to both the off-card entity and the eUICC, can be used to secure communications that are transmitted between the off-card entity and the eUICC until the session is closed. It is noted that, because the half forward security approach does not require the eUICC to generate ephemeral PKI information, the amount of overhead processing that is required at the eUICC can be reduced. A drawback, however, is that if the long-term private key possessed by the eUICC (i.e., $SK_{eUICC}$) is compromised by a malicious party, then the malicious party can potentially access previous communications associated with the eUICC using the compromised $SK_{eUICC}$ key.

Upon establishment of the shared session-based symmetric key, the off-card entity and the eUICC can securely communicate information between one another. In some embodiments, each of the off-card entity and the eUICC can be configured to cache the shared session-based symmetric key to reduce the overhead involved when subsequently establishing secure communication channels. However, to maintain a maximum level of security, each of the off-card entity and the eUICC can be configured to generate new session-based symmetric keys (using the approaches set forth herein) each time a secure communication channel is established.

The foregoing techniques provide various benefits that are not provided by conventional approaches. One benefit is that the off-card entity and the eUICC can establish a secure communication channel over an unsecured connection, e.g., the Internet. This increases the overall bandwidth that is available, which can be important at peak management times (e.g., with the launch of a new wireless device). Another benefit is that Certificate Authorities can be utilized to increase the level of security when the off-card entity and the eUICC authenticate one another (though, as noted above, this is not required). Yet another benefit is that shared session-based symmetric keys can be cached for subsequent use, which can help reduce the overhead involved each time the off-card entity and the eUICC need to securely communicate with one another. Yet another benefit is that "perfect forward" security and "half forward" security can be implemented, which can increase customer satisfaction with respect to privacy concerns. Yet another benefit is that, in some embodiments, the ephemeral PKI information is not derived using the long-term PKI information assigned to the off-card entity and/or the eUICC. Beneficially, this can increase the difficulty involved in deriving the long-term PKI information even when the ephemeral PKI information is compromised.

It will be appreciated that a variety of encryption algorithms can be used to carry out the various techniques set forth herein, e.g., Diffie-Hellman, Elliptic Curve Cryptography (ECC), Rivest/Shamir/Adleman (RSA) asymmetric algorithm, and the like.

These and other embodiments are discussed below with reference to FIGS. 1-3, 4A-4B, and 5A-5B. However, those skilled in the art will readily appreciate that the detailed description given herein with respect to these Figures is for explanatory purposes only and should not be construed as limiting.

FIG. 1 illustrates an example system 100 for eSIM provisioning in accordance with some example embodiments. The system 100 can include a provisioning entity 102 and one or more wireless communication devices 106, which can communicate over a network 104.

The provisioning entity 102 can be embodied as one or more computing devices that can be configured to generate and/or provision eSIMs to eUICCs (e.g., eUICC 120) implemented on wireless communication devices 106 in accordance with various example embodiments. The provisioning entity 102 can, for example, comprise one or more physical servers, a cloud computing infrastructure configured to implement functionality of the provisioning entity 102 (e.g., a virtual computing system implemented on underlying physical hardware), and/or other server device(s). In embodiments in which functionality of the provisioning entity 102 is provided by multiple physical computing devices, the computing devices can be co-located in a common location, or can be distributed across multiple physical locations and can communicate via the network 104. The provisioning entity 102 can be hosted/operated by any entity that can maintain and provision a pool of eSIMs, such as by way of non-limiting example, a mobile network operator(s), a device manufacturer, a device vendor, or other such entity.

The network 104 can be embodied as any network or combination of networks configured to support communication between two or more computing devices, such as provisioning entity 102 and the wireless communication device 106. By way of non-limiting example, the network 104 can comprise one or more wireline networks, one or more wireless networks (e.g., a cellular network(s), wireless local area network(s), wireless wide area network(s), wireless metropolitan area network(s), some combination thereof, or the like), or a combination thereof, and in some example embodiments can comprise the Internet.

The wireless communication device 106 can be embodied as any computing device that can be configured to access a cellular network. By way of non-limiting example, the wireless communication device 106 can be embodied as a cellular phone, such as a smart phone, a tablet computing device, a digital media player device, a cellular wireless hotspot device, a laptop computer, some combination thereof, or the like. As a further example, the wireless communication device 106 can be embodied as a machine-to-machine (M2M) device or the like that can be configured to access a cellular network.

The wireless communication device 106 can include an eUICC 120, which can also be referred to as a "secure element." In some embodiments, the eUICC 120 can be embedded within (e.g., soldered to) a main system board of the wireless communication device 106. In some example embodiments, the eUICC 120 can comprise a sandboxed hardware/software environment that cannot be directly accessed by external entities, such as a main, or host, operating system (OS) that can be executed on the wireless communication device 106. The eUICC 120 can include processing circuitry, such as a microprocessor, and a storage device that can work together to process commands and carry out various authentication mechanisms that can be used to enable the wireless communication device 106 to access a mobile network operator's network. In this regard, the eUICC 120 can be configured to maintain one or more eSIMs, such as an eSIM that can be provisioned by the provisioning entity 102. The eUICC 120 can be configured to use an eSIM installed on the eUICC 120 to facilitate network authentication for accessing a mobile operator's network.

The wireless communication device 106, and thus an eSIM that can be provisioned by the provisioning entity 102 and/or installed on the eUICC 120 can be configured for accessing networks using any of a variety of radio access technologies (RATs). By way of non-limiting example, the wireless communication device 106 and/or an eSIM in accordance with some example embodiments can support a Long Term Evolution (LTE) RAT, such as various releases of the LTE standard specified by the Third Generation Partnership Project (3GPP), including various releases of LTE, LTE-Advanced (LTE-A), and/or other present or future releases using LTE technology. As another example, the wireless communication device 106 and/or an eSIM in accordance with some example embodiments can support a third generation (3G) cellular RAT, such as Wideband Code Division Multiple Access (WCDMA) or other Universal Mobile Telecommunications System (UMTS) RAT, such as Time Division Synchronous Code Division Multiple Access (TD-SCDMA); CDMA2000; 1xRTT; and/or the like. As another example, the wireless communication device 106 and/or an eSIM in accordance with some example embodiments can support a second generation (2G) cellular RAT, such as a Global System for Mobile Communications (GSM) RAT. It will be appreciated that the foregoing RATs are provided by way of example, and not by way of limitation. In this regard, the wireless communication device 106 and/or an eSIM in accordance with some example embodiments can be configured to communicate via any present or future developed cellular RAT, including, for example, various fifth generation (5G) RATs now in development.

As described previously, the provisioning entity 102 can be configured to provision an eSIM to the eUICC 120 via the network 104. This provisioning can, for example, be accomplished using various over-the-air (OTA) techniques. Additionally or alternatively, in some example embodiments, the wireless communication device 106 can be connected to the network 104 and/or directly to the provisioning entity 102 via a wireline connection and an eSIM can be provisioned to the eUICC 120 via the wireline connection. An eSIM provisioned to the eUICC 120 can be included in an eSIM package that can be generated and formatted by the provisioning entity 102 in accordance with various embodiments described further herein below. The eUICC 120 can be configured to unpack the eSIM from the eSIM package and install the eSIM on the eUICC 120.

In some example embodiments, the provisioning entity 102 and eUICC 120 can be configured to implement and/or otherwise support one or more logical security layers that can provide security mechanisms for the provisioning process. For example, the provisioning entity 102 of some example embodiments can be configured to implement one or more of a level 1 (L1) entity 110, level 2 (L2) entity 112, and level 3 (L3) entity 114. The eUICC 120 of some example embodiments can locally implement logical security layers and/or processes (e.g., L1, L2, and L3) corresponding to the logical security entities of the provisioning entity 102. In accordance with some example embodiments, L1 (e.g., the L1 entity 110 and any corresponding L1 layer/process on the eUICC 120) can provide encryption services; L2 (e.g., the L2 entity 112 and any corresponding L2 layer/process on the eUICC 120) can provide anti-cloning services; and L3 (e.g., the L3 entity 114 and any corresponding L3 layer/process on the eUICC 120) can provide authorization services. In some example embodiments, one or more of the L1 entity 110, L2 entity 112, and L3 entity 114 can be implemented as a logical software entity running on a common physical server or set of servers. Alternatively, in some example embodiments, individual logical security entity, such as individual ones of the L1 entity 110, L2 entity 112, and L3 entity 114 can be implemented on physical servers that are discrete from servers implementing another logical security entity.

Figure 2:
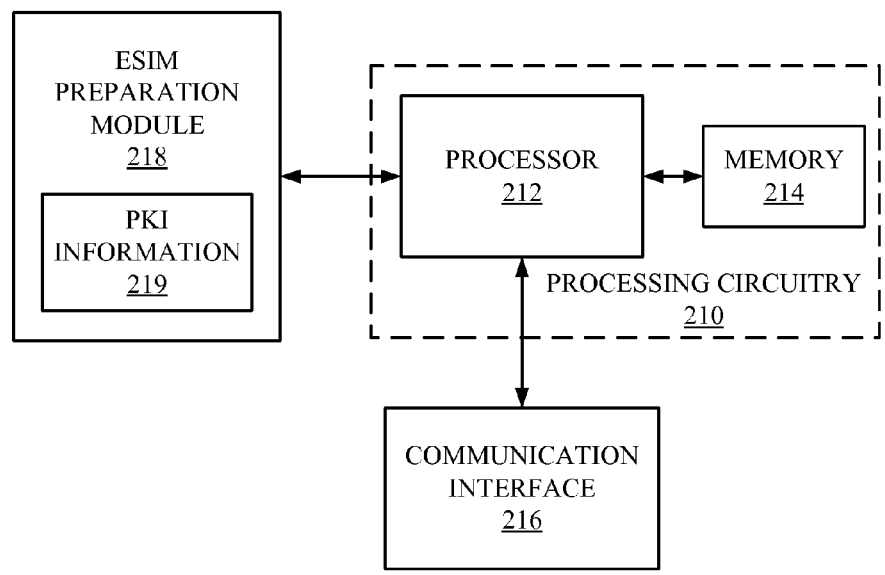
FIG. 2 illustrates a block diagram of an apparatus that can be implemented on a provisioning entity in accordance with some example embodiments.

FIG. 2 illustrates a block diagram of an apparatus 200 that can be implemented on a provisioning server, such as provisioning entity 102, in accordance with some example embodiments. In this regard, the apparatus 200 can be implemented on any computing device or plurality of computing devices that can collectively be configured to implement functionality of the provisioning entity 102. It will therefore be appreciated that one or more of the components illustrated in and described with respect to FIG. 2 can be implemented on a single computing device, or can be distributed across a plurality of computing devices that may collectively provide functionality of the provisioning entity 102 in accordance with one or more example embodiments. It will additionally be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of a provisioning server, such as provisioning entity 102, in accordance with various example embodiments. Thus, the processing circuitry 210 may be configured to perform data processing, application execution and/or other processing and management services that can be implemented for preparing and provisioning an eSIM according to one or more example embodiments, such as those illustrated in and described below with respect to FIGS. 4A-4B and 5A-5B.

In some embodiments, the apparatus 200 or a portion(s) or component(s) thereof, such as the processing circuitry 210, can be implemented via one or more integrated circuits, each of which can include one or more chips. The processing circuitry 210 and/or one or more further components of the apparatus 200 can therefore, in some instances, be configured to implement an embodiment on an integrated circuit (e.g., as a "system on a chip").

In some example embodiments, the processing circuitry 210 can include a processor 212, and, in some embodiments, such as that illustrated in FIG. 2, can further include memory 214. The processing circuitry 210 can be in communication with or otherwise control a communication interface 216 and/or eSIM preparation module 218.

The processor 212 can be embodied in a variety of forms. For example, the processor 212 can be embodied as various hardware-based processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the provisioning entity 102. In some embodiments in which the apparatus 200 is embodied on a plurality of computing devices, a plurality of processors, which can collectively form the processor 212, can be distributed across a plurality of computing devices that can be in operative communication with each other directly and/or via a network, such as the network 104. In some example embodiments, the processor 212 can be configured to execute instructions that may be stored in the memory 214 and/or that can be otherwise accessible to the processor 212. In this manner, whether configured by hardware or by a combination of hardware and software, the processor 212 can be capable of performing operations according to various embodiments while configured accordingly.

In some example embodiments, the memory 214 can include one or more memory and/or other storage devices. Memory 214 can include fixed and/or removable memory devices. In embodiments in which the memory 214 includes a plurality of memory devices, the plurality of memory devices can be embodied on a single computing device, or can be distributed across a plurality of computing devices (e.g., a plurality of computing devices forming the provisioning entity 102 of some example embodiments), which can collectively provide functionality of the apparatus 200. In some embodiments, the memory 214 can comprise a non-transitory computer-readable storage medium that can store computer program instructions that can be executed by the processor 212. In this regard, the memory 214 can be configured to store information, data, applications, instructions and/or the like for enabling the apparatus 200 to carry out various functions of the provisioning entity 102 in accordance with one or more example embodiments. For example, the memory 214 of some example embodiments can be configured to store one or more eSIMs that can be available for provisioning to an eUICC, such as eUICC 120. The memory 214 can additionally or alternatively store parameters associated with various eUICCs, which can be used to facilitate preparing and packaging an eSIM for provisioning as described further herein below. In some embodiments, the memory 214 can be in communication with one or more of the processor 212, communication interface 216, or eSIM preparation module 218 via one or more buses for passing information among components of the apparatus 200.

The apparatus 200 can further include a communication interface 216. The communication interface 216 can be configured enable the apparatus 200 to communicate with another computing device, such as over the network 104. In this regard, the communication interface 216 can include one or more interface mechanisms for enabling communication with other devices and/or networks. In this manner, the communication interface 216 can include, for example, an antenna (or multiple antennas) and supporting hardware and/or software for enabling communications with a wireless communication network (e.g., a cellular network, Wi-Fi, Li-Fi, WLAN, and/or other wireless communication network) and/or a communication modem or other hardware/software for supporting communication via cable, digital subscriber line (DSL), USB, FireWire, Ethernet, one or more optical transmission technologies, and/or other wireline networking methods. Thus, for example, the communication interface 216 can be configured to support communication with the wireless communication device 106 and/or eUICC 120 implemented thereon via the network 104 to enable the provisioning entity 102 to participate in an eSIM provisioning session and provision an eSIM to the eUICC 120.

The apparatus 200 can further include eSIM preparation module 218. The eSIM preparation module 218 can be embodied as various means, such as circuitry, hardware, a computer program product comprising a computer readable medium (for example, the memory 214) storing computer readable program instructions executable by a processing device (for example, the processor 212), or some combination thereof. In some embodiments, the processor 212 (or the processing circuitry 210) can include, or otherwise control the eSIM preparation module 218. The eSIM preparation module 218 of some example embodiments can be configured to prepare and provision an eSIM using PKI information 219 according to one or more example embodiments, such as those illustrated in and described below with respect to FIGS. 4A-4B and 5A-5B.

Figure 3:
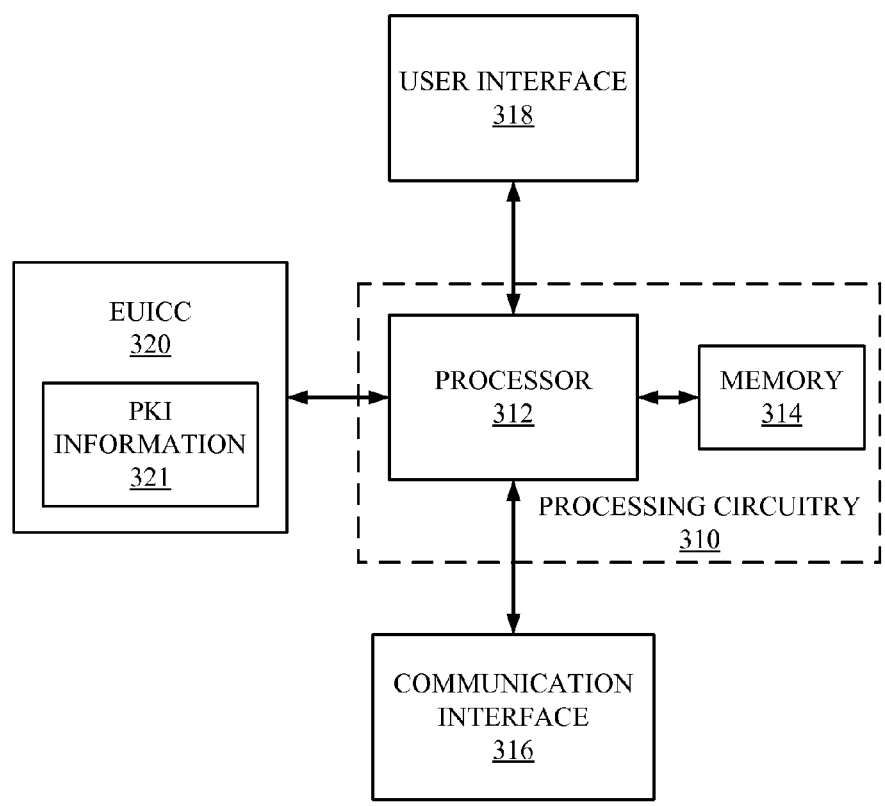
FIG. 3 illustrates a block diagram of an apparatus that can be implemented on a wireless communication device in accordance with some example embodiments.

FIG. 3 illustrates a block diagram of an apparatus 300 that can be implemented on a wireless communication device, such as wireless communication device 106, in accordance with some example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the apparatus 300 in accordance with various example embodiments. The processing circuitry 310 can be configured to perform data processing, application execution and/or other processing and management services according to one or more example embodiments. For example, in some embodiments, the processing circuitry 310 can be configured to support operation of a main host operating system of a wireless communication device.

In some embodiments, the apparatus 300 or a portion(s) or component(s) thereof, such as the processing circuitry 310, can be implemented via one or more integrated circuits, each of which can include one or more chips. The processing circuitry 310 and/or one or more further components of the apparatus 300 can therefore, in some instances, be configured to implement an embodiment on an integrated circuit (e.g., as a "system on a chip"). In some example embodiments, one or more components of the apparatus 300 can be implemented on a chipset capable of enabling a computing device to access a network, such as wireless network 104, when implemented on or otherwise operably coupled to the computing device. In some such example embodiments, the apparatus 300 can include a cellular baseband chipset, which can be configured to enable a computing device, such as wireless communication device 106, to operate on one or more cellular networks.

In some example embodiments, the processing circuitry 310 can include a processor 312 and, in some embodiments, such as that illustrated in FIG. 3, can further include memory 314. The processing circuitry 310 can be in communication with or otherwise control the communication interface 316 and/or user interface 318.

The processor 312 can be embodied in a variety of forms. For example, the processor 312 can be embodied as various hardware-based processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the wireless communication device 106 as described herein. In some example embodiments, the processor 312 can be configured to execute instructions that can be stored in the memory 314 or that can be otherwise accessible to the processor 312. In this manner, whether configured by hardware or by a combination of hardware and software, the processor 312 capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, communication interface 316, user interface 318, or eUICC 320 via one or more buses for passing information among components of the apparatus 300.

The apparatus 300 can further include a communication interface 316. The communication interface 316 of some example embodiments can provide a wireless communication interface configured to enable the apparatus 300 to send wireless signals to and receive signals from one or more wireless networks. For example, the communication interface 316 of some example embodiments can be configured to support access to a cellular network by enabling wireless communication with a cellular base station. The communication interface 316 can accordingly include one or more transceivers and supporting hardware and/or software for enabling communication in accordance with one or more cellular RATs. The communication interface 316 of some embodiments can further include one or more transceivers and/or other radio components to support one or more further wireless communication technologies, such as Wi-Fi (e.g., an IEEE 802.11 technology), BLUETOOTH®, and/or other wireless communications technology. In some example embodiments, the communication interface 316 can additionally include a communication modem or other hardware/software for supporting communication via cable, digital subscriber line (DSL), USB, FireWire, Ethernet, one or more optical transmission technologies, and/or other wireline networking methods.

In some example embodiments, the apparatus 300 may include the user interface 318. It will be appreciated, however, that in some example embodiments, one or more aspects of the user interface 318 may be omitted, and in some embodiments, the user interface 318 may be omitted entirely. The user interface 318 can be in communication with the processing circuitry 310 to receive an indication of a user input and/or to provide an audible, visual, mechanical, or other output to a user. In this manner, the user interface 318 can include, for example, a keyboard, a mouse, a joystick, a display, a touch screen display, a microphone, a speaker, one or more biometric input devices, and/or other input/output mechanisms. In embodiments wherein the user interface 318 comprises a touch screen display, the user interface 318 can additionally be configured to detect and/or receive an indication of a touch and/or other movement gesture or other input to the display.

The apparatus 300 can further include the eUICC 320, which can, for example, comprise an embodiment of the eUICC 120. The eUICC 320 can accordingly include processing circuitry and a storage device that can be configured to store and manage one or more eSIMs that can be provisioned by the provisioning entity 102 in accordance with various example embodiments. The eUICC 320 can be configured to unpack and install an eSIM provisioned by the provisioning entity 102 using PKI information 321 in accordance with various example embodiments, such as those illustrated in and described below with respect to FIGS. 4A-4B and 5A-5B.

Figure 4A:
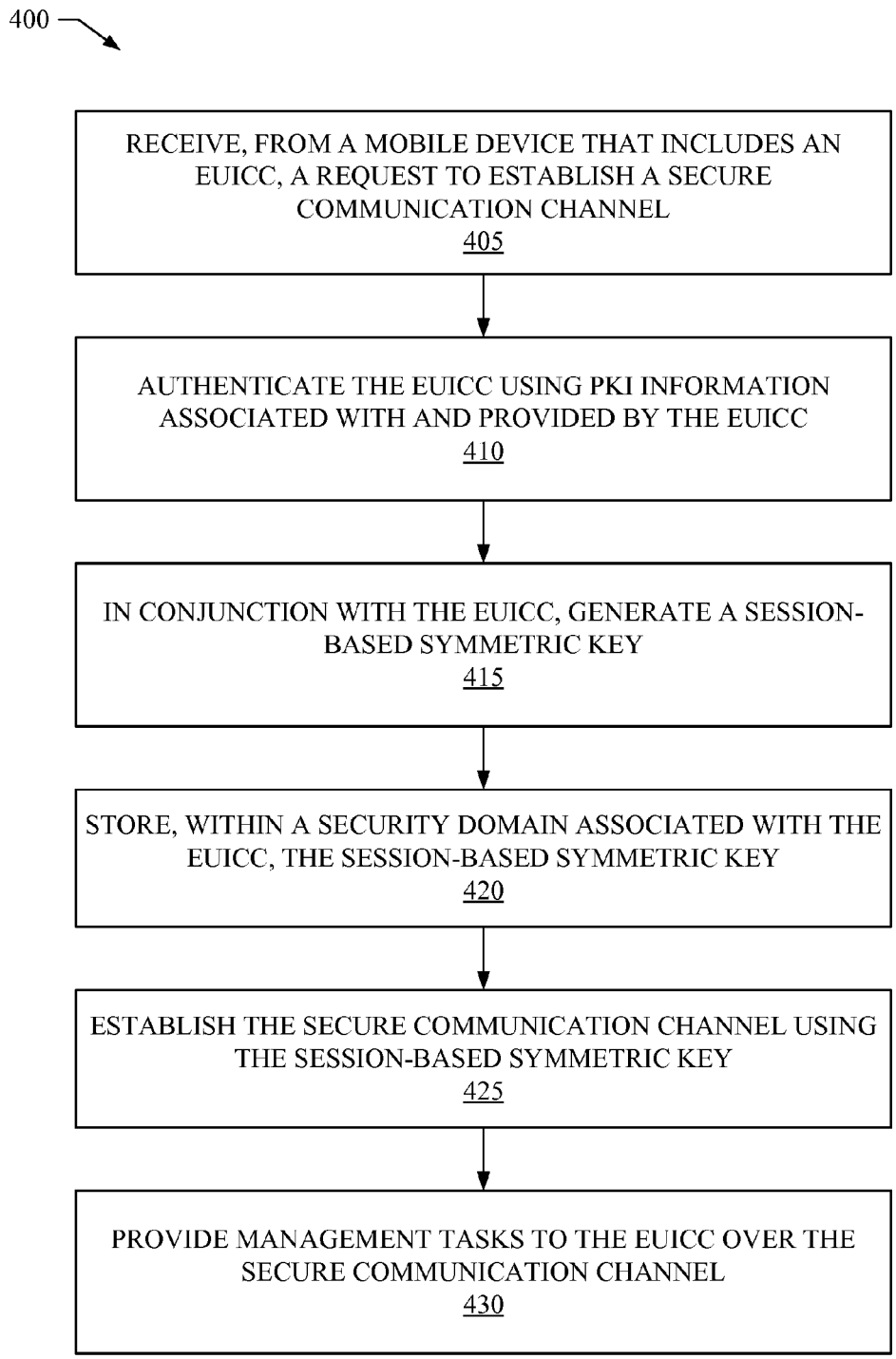
FIGS. 4A-4B illustrate example methods for establishing a secure session between a provisioning entity and an eUICC of a communication device, according to some embodiments.

FIG. 4A illustrates a method 400 for establishing a secure session between a provisioning entity and an eUICC of a communication device, according to some embodiments. Specifically, the method 400 can be performed by the provisioning entity 102 of some example embodiments. One or more of processing circuitry 210, processor 212, memory 214, communication interface 216, and eSIM preparation module 218 can, for example, provide means for performing the operations illustrated in and described with respect to FIG. 4A.

As shown in FIG. 4A, the method 400 begins at 405, where the provisioning entity 102 receives, from a mobile device (e.g., wireless communication device 106) that includes an eUICC (e.g., the eUICC 120 of the wireless communication device 106), a request to establish a secure communication channel. 405 can be performed in response to determining that the eUICC 120 is a target to which an eSIM is to be provisioned, which can be initiated by the wireless communication device 106 and/or eUICC 120. At 410, the provisioning entity 102 authenticates the eUICC 120 in accordance with the PKI information associated with and provided by the eUICC 120. Specifically, the provisioning entity 102 can authenticate the eUICC 120 based on the public key ($PK_{eUICC}$) possessed by the eUICC 120. The authentication can further involve, for example, the provisioning entity 102 requiring the eUICC 120 to sign data (e.g., a random value) using the private key ($SK_{eUICC}$) counterpart to prove that the eUICC 120 is the true owner of the $PK_{eUICC}$ and the $SK_{eUICC}$.

At 415, the provisioning entity 102, in conjunction with the eUICC 120, generates a session-based symmetric key (i.e., ephemeral symmetric key). In some embodiments, the provisioning server 102 can implement a Certificate Authority Security Domain (CASD) that is configured to facilitate the generation of the session-based symmetric key utilized by each of the provisioning entity 102 and the eUICC 120 when establishing the secure communication channel. For example, when the provisioning entity 102 is attempting to establish the secure communication channel with the eUICC 120, the provisioning server 102 can issue a request to the CASD for a session-based symmetric key that is based at least on the PKI information exchanged between the provisioning entity 102 and the eUICC 120. At 420, the provisioning entity 102 stores, within a security domain (e.g., a protected storage area accessible to the provisioning entity 102) associated with the eUICC 120, the session-based symmetric key. At 425, the provisioning entity 102 establishes the secure communication channel with the eUICC 120 using the session-based symmetric key. In some cases, the provisioning server 102 can optionally cache (e.g., within the security domain) the session-based symmetric key for establishing subsequent secure communication channels with the eUICC 120. Caching the session-based symmetric key by the provisioning server 102 would also involve the eUICC 120 caching the session-based symmetric key so that the subsequent secure communication channel can effectively be established. At 430, the provisioning entity 102 provides management tasks to the eUICC 120 over the secure communication channel. Such management tasks can involve, for example, providing a new eSIM to be installed by the eUICC 120, providing an update to an eSIM (e.g., enable/disable the eSIM, update the eSIM to a new version, etc.) managed by the eUICC 120, causing an eSIM managed by the eUICC 120 to be removed from the eUICC 120, and the like.

Figure 4B:
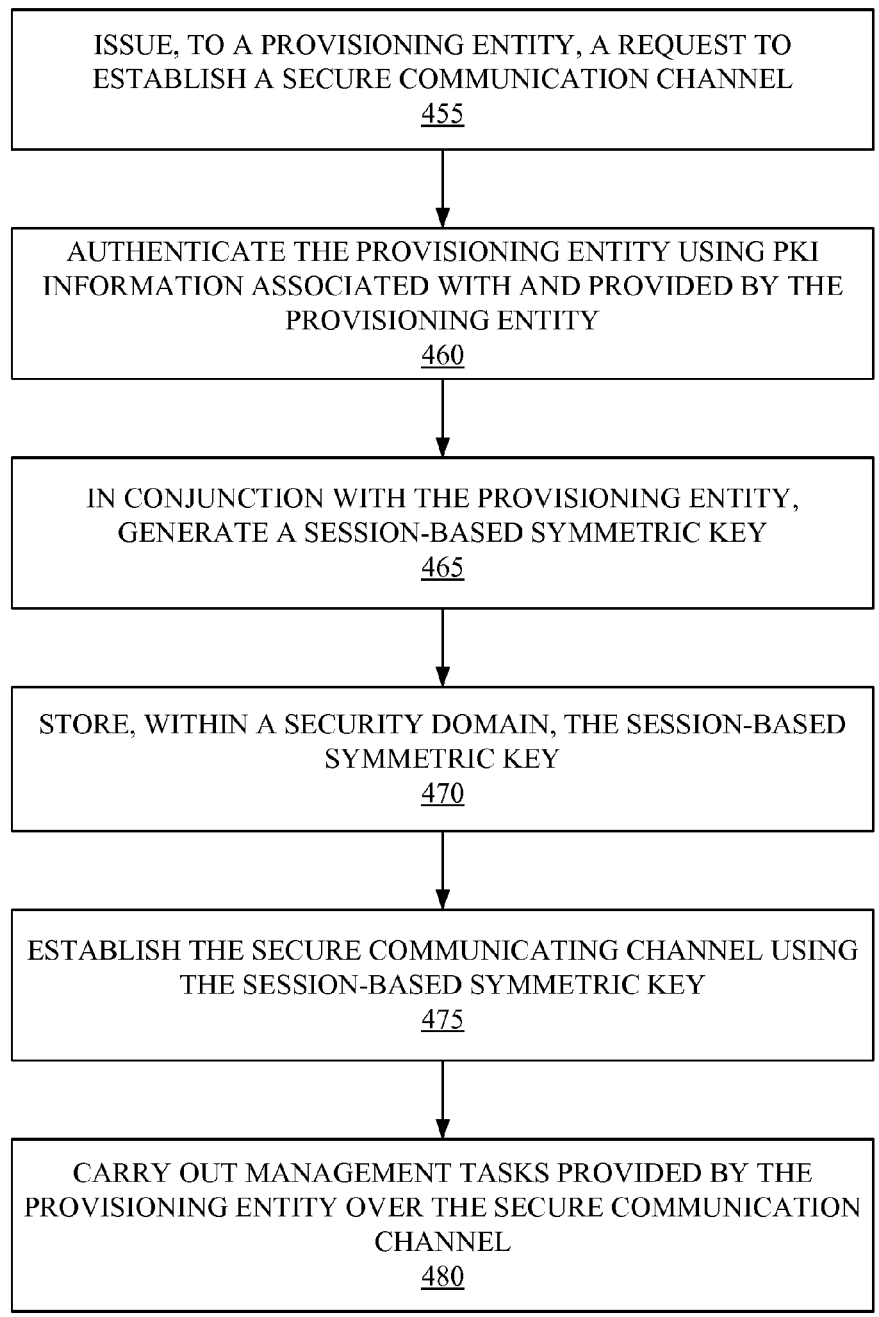

FIG. 4B illustrates a method 450 for establishing a secure session between the eUICC 120 and the provisioning entity 102, according to some embodiments. As shown, the method 450 begins at 455, where the eUICC 120 issues, to the provisioning entity 102, a request to establish a secure communication channel. At 460, the eUICC 120 authenticates the provisioning entity 102 in accordance with the PKI information (e.g., a public key included in the PKI information 219) associated with and provided by the provisioning entity 102. At 465, the eUICC 120, in conjunction with the provisioning entity 102, generates a session-based symmetric key. In some embodiments, the eUICC 120 can implement a Certificate Authority Security Domain (CASD) that is configured to facilitate the generation of the session-based symmetric key utilized by each of the eUICC 120 and the provisioning entity 102 when establishing the secure communication channel. For example, when the eUICC 120 is attempting to establish the secure communication channel with the provisioning entity 102, the eUICC 120 can issue a request to the CASD for a session-based symmetric key that is based at least on the PKI information exchanged between the eUICC 120 and the provisioning entity 102.

At 470, the eUICC 120 stores, within a security domain (e.g., a protected area of memory included in the eUICC 120) managed by the eUICC 120, the session-based symmetric key. At 475, the eUICC 120 establishes the secure communication channel with the provisioning entity 102 using the session-based symmetric key. In some cases, the eUICC 120 can optionally cache the session-based symmetric key (e.g., within the security domain) for establishing subsequent secure communication channels with the provisioning entity 102. Caching the session-based symmetric key at the eUICC 120 would also involve the provisioning server 102 caching the session-based symmetric key so that the subsequent secure communication channel can effectively be established. At 480, the eUICC 120 carries out management tasks provided by the provisioning entity 102 over the secure communication channel.

It will be appreciated that the operations illustrated in and described with respect to FIGS. 4A-4B are not limited to the illustrated order. In this regard, various operations can be performed concurrently and/or in a different order than that illustrated in FIGS. 4A-4B.

Figure 5A:
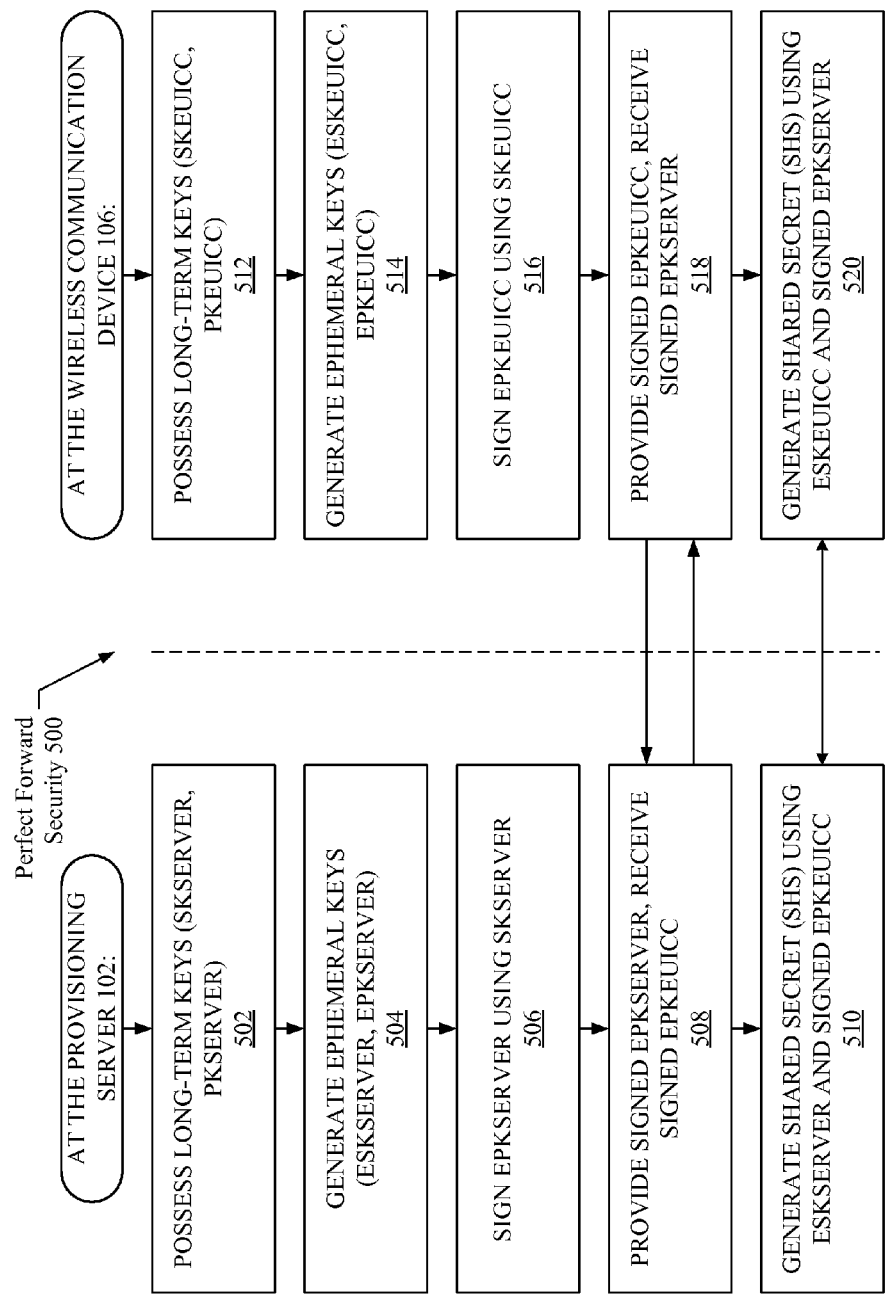
FIGS. 5A-5B illustrate example methods for establishing perfect forward security or half forward security, according to some embodiments.

FIG. 5A illustrates a method for establishing perfect forward security 500, according to some embodiments. As shown, the method 500 begins at 502, which involves the provisioning entity 102 possessing long-term keys ($SK_{server}$, $PK_{server}$) (e.g., the PKI information 219 illustrated in FIG. 2). At 504, the provisioning entity 102 generates ephemeral PKI information that consists of the keys ($eSK_{server}$, $ePK_{server}$). At 506, the provisioning entity 102 signs the $ePK_{server}$ using the $SK_{server}$. At 508, the provisioning entity 102 provides the signed $ePK_{server}$ to the wireless communication device 106, and receives a signed $ePK_{eUICC}$ from the wireless communication device 106 (produced at step 516 by the wireless communication device, which is described below). At 510, the provisioning entity 102 generates a shared secret (ShS) (i.e., a session-based symmetric key) using the $eSK_{server}$ and the signed $ePK_{eUICC}$.

At 512, the wireless communication device 106 possesses long-term keys ($SK_{eUICC}$, $PK_{eUICC}$) (e.g., the PKI information 321 illustrated in FIG. 3). At 514, the wireless communication device 106 generates ephemeral PKI information that consists of the keys ($eSK_{eUICC}$, $ePK_{eUICC}$). At 516, the wireless communication device 106 signs the $ePK_{eUICC}$ using the $SK_{eUICC}$. At 518, the wireless communication device 106 provides the signed $ePK_{eUICC}$ to the provisioning entity 102, and receives the signed $ePK_{server}$ from the provisioning entity 102 (as produced at 506 described above). At 520, the wireless communication device 106 generates the same ShS (i.e., session-based symmetric key) using the $eSK_{eUICC}$ and the signed $ePK_{server}$.

Figure 5B:
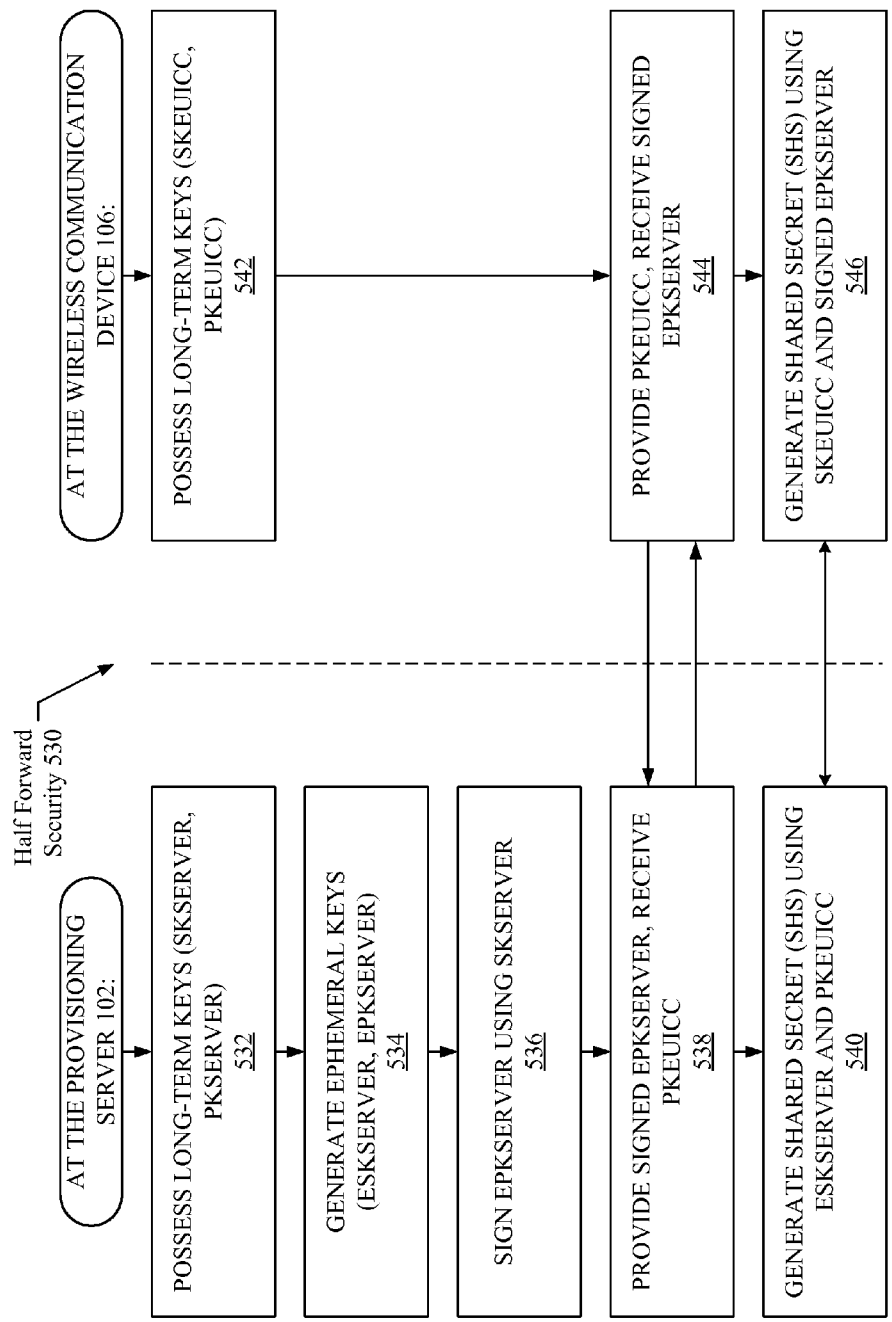

FIG. 5B illustrates a method for establishing half forward security 530, according to some embodiments. As shown, the method 530 begins at 532, which involves the provisioning entity 102 possessing long-term keys ($SK_{server}$, $PK_{server}$) (e.g., the PKI information 219 illustrated in FIG. 2). At 534, the provisioning entity 102 generates ephemeral PKI information that consists of the keys ($eSK_{server}$, $ePK_{server}$). At 536, the provisioning entity 102 signs the $ePK_{server}$ using the $SK_{server}$. At 538, actor provides the signed $ePK_{server}$ to the wireless communication device 106, and receives the $PK_{eUICC}$ from the wireless communication device 106. At 540, the provisioning entity 102 generates an ShS (i.e., session-based symmetric key) using the $eSK_{server}$ and the $PK_{eUICC}$.

At 542, the wireless communication device 106 possesses long-term keys ($SK_{eUICC}$, $PK_{eUICC}$) (e.g., the PKI information 321 illustrated in FIG. 3). At 544, the wireless communication device 106 provides the $PK_{eUICC}$ to the provisioning entity 102, and receives the signed $ePK_{server}$ from the provisioning entity 102 (as produced at 536, described above). At 546, the wireless communication device 106 generates the shared secret (ShS) using the $PK_{eUICC}$ and the signed $ePK_{server}$.

In sum, the techniques set forth herein provide various advantages over conventional approaches. Specifically, these techniques enable an off-card entity and an eUICC to establish a secure communication channel over an unsecured connection, e.g., the Internet, which increases the overall bandwidth that is available for establishing such connections. Again, this can be important at peak management times (e.g., with the launch of a new wireless device). These techniques also enable the participation of Certificate Authorities, which can provide increased levels of security when the off-card entity and the eUICC authenticate one another (though, as noted above, this is not required). These techniques also enable session-based symmetric keys to be cached for subsequent use, which can help reduce the overhead involved each time the off-card entity and the eUICC need to securely communicate with one another. These techniques further enable perfect forward security or half forward security to be established, which can be a desirable feature with respect to the privacy concerns of customers. These techniques also provide the benefit of establishing ephemeral PKI information that is not derived using long-term PKI information, which can increase the difficulty involved in deriving the long-term PKI information even when the ephemeral PKI information is compromised.

The various aspects, embodiments, implementations or features of the described embodiments can be used separately or in any combination. Various aspects of the described embodiments can be implemented by software, hardware, or a combination of hardware and software. The described embodiments can also be embodied as a computer readable medium (or mediums) storing computer readable code including instructions that can be performed by one or more computing devices. The computer readable medium may be associated with any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for establishing a secure connection between a server and an embedded Universal Integrated Circuit Card (eUICC) included in a mobile device, wherein the eUICC is associated with a long-term public key ($PK_{eUICC}$) and a long-term private key ($SK_{eUICC}$), the method comprising:
at the server, which is associated with a long-term public key ($PK_{server}$) and a long-term private key ($SK_{server}$):
receiving, from the mobile device, a request to establish the secure connection with the mobile device;
receiving, from the eUICC, public key infrastructure (PKI) information comprising: i) a signature based on $SK_{eUICC}$, and ii) $PK_{eUICC}$;
authenticating an identity of the eUICC by verifying that the signature is based on $SK_{eUICC}$;
generating, subsequent to the authenticating, an ephemeral public key ($ePK_{server}$) and an ephemeral private key ($eSK_{server}$);
signing $ePK_{server}$ using $SK_{server}$ to produce a signed $ePK_{server}$;
providing the signed $ePK_{server}$ to the mobile device;
receiving, from the mobile device, an ephemeral key ($ePK_{eUICC}$) that is signed using $SK_{eUICC}$;
generating a shared symmetric key using $eSK_{server}$ and $ePK_{eUICC}$; and
establishing the secure connection using the shared symmetric key.

2. The method of claim 1, further comprising:
transmitting, over the secure connection, an electronic Subscriber Identity Module (eSIM) to the eUICC.

3. The method of claim 1, further comprising:
providing, over the secure connection, an update to an electronic Subscriber Identity Module (eSIM) managed by the eUICC.

4. The method of claim 1, further comprising:
causing, over the secure connection, the eUICC to remove an electronic Subscriber Identity Module (eSIM) managed by the eUICC.

5. The method of claim 1, further comprising:
caching, within a security domain associated with the eUICC, the shared symmetric key for establishing a different secure connection at a later time with the mobile device.

6. A method for establishing a secure connection between a server and an embedded Universal Integrated Circuit Card (eUICC) included in a mobile device, wherein the eUICC is associated with a long-term public key ($PK_{eUICC}$) and a long-term private key ($SK_{eUICC}$), the method comprising:
at the server, which is associated with a long-term public key ($PK_{server}$) and a long-term private key ($SK_{server}$):

receiving, from the mobile device, a request to establish the secure connection with the mobile device;

receiving, from the eUICC, public key infrastructure (PKI) information comprising: i) a signature, and ii) $PK_{eUICC}$;

authenticating an identity of the eUICC, wherein the authenticating comprises determining that the signature is based on $SK_{eUICC}$;

generating, subsequent to the authenticating, an ephemeral public key ($ePK_{server}$) and an ephemeral private key ($eSK_{server}$);

signing $ePK_{server}$ using $SK_{server}$ to produce a signed $ePK_{server}$;

providing the signed $ePK_{server}$ to the mobile device;

generating a shared symmetric key using $eSK_{server}$ and $PK_{eUICC}$; and establishing the secure connection using the shared symmetric key.

7. The method of claim 6, further comprising:
transmitting, over the secure connection, an electronic Subscriber Identity Module (eSIM) to the eUICC.

8. The method of claim 6, further comprising:
providing, over the secure connection, an update to an electronic Subscriber Identity Module (eSIM) managed by the eUICC.

9. A non-transitory computer readable medium comprising instructions that when executed by a server cause the server to establish a secure connection between a server and an embedded Universal Integrated Circuit Card (eUICC) included in a mobile device, wherein the eUICC is associated with a long-term public key ($PK_{eUICC}$) and a long-term private key ($SK_{eUICC}$) and the server is associated with a long-term public key ($PK_{server}$) and a long-term private key ($SK_{server}$), by performing operations comprising:

receiving, from the mobile device, a request to establish the secure connection with the mobile device;

receiving, from the eUICC, public key infrastructure (PKI) information comprising: i) a signature based on $SK_{eUICC}$, and ii) $PK_{eUICC}$;

authenticating an identity of the eUICC by verifying that the signature is based on $SK_{eUICC}$;

generating, subsequent to the authenticating, an ephemeral public key ($ePK_{server}$) and an ephemeral private key ($eSK_{server}$);

signing $ePK_{server}$ using $SK_{server}$ to produce a signed $ePK_{server}$;

providing the signed $ePK_{server}$ to the mobile device;

receiving, from the mobile device, an ephemeral key ($ePK_{eUICC}$) that is signed using $SK_{eUICC}$;

generating a shared symmetric key using $eSK_{server}$ and $ePK_{eUICC}$; and establishing the secure connection using the shared symmetric key.

10. The non-transitory computer readable medium of claim 9, wherein the operations further comprise:
transmitting, over the secure connection, an electronic Subscriber Identity Module (eSIM) to the eUICC.

11. The non-transitory computer readable medium of claim 9, wherein the operations further comprise:
providing, over the secure connection, an update to an electronic Subscriber Identity Module (eSIM) managed by the eUICC.

12. The non-transitory computer readable medium of claim 9, wherein the operations further comprise:
causing, over the secure connection, the eUICC to remove an electronic Subscriber Identity Module (eSIM) managed by the eUICC.

13. The non-transitory computer readable medium of claim 9, wherein the operations further comprise:
caching, within a security domain associated with the eUICC, the shared symmetric key for establishing a different secure connection at a later time with the mobile device.

14. A server comprising:
a memory; and
a processor, wherein the memory comprises instructions that when executed by the processor cause the server to establish a secure connection between the server and an embedded Universal Integrated Circuit Card (eUICC) included in a mobile device, wherein the eUICC is associated with a long-term public key ($PK_{eUICC}$) and a long-term private key ($SK_{eUICC}$), and wherein the server is associated with a long-term public key ($PK_{server}$) and a long-term private key ($SK_{server}$), by performing operations comprising:

receiving, from the mobile device, a request to establish the secure connection with the mobile device, receiving, from the eUICC, public key infrastructure (PKI) information comprising: i) a signature, and ii) $PK_{eUICC}$, authenticating an identity of the eUICC, wherein the authenticating comprises determining that the signature is based on $SK_{eUICC}$, generating, subsequent to the authenticating, an ephemeral public key ($ePK_{server}$) and an ephemeral private key ($eSK_{server}$), signing $ePK_{server}$ using $SK_{server}$ to produce a signed $ePK_{server}$, providing the signed $ePK_{server}$ to the mobile device, generating a shared symmetric key using $eSK_{server}$ and $PK_{eUICC}$, and establishing the secure connection using the shared symmetric key.

15. The server of claim 14, wherein the operations further comprise:
transmitting, over the secure connection, an electronic Subscriber Identity Module (eSIM) to the eUICC.

16. The server of claim 14, wherein the operations further comprise:
providing, over the secure connection, an update to an electronic Subscriber Identity Module (eSIM) managed by the eUICC.

17. The server of claim 14, wherein the operations further comprise:
causing, over the secure connection, the eUICC to remove an electronic Subscriber Identity Module (eSIM) managed by the eUICC.

18. The server of claim 14, wherein the operations further comprise:
caching, within a security domain associated with the eUICC, the shared symmetric key for establishing a different secure connection at a later time with the mobile device.

* * * * *